Nov. 24, 1936.   G. D. BAGLEY   2,061,692
TESTING APPARATUS
Filed Sept. 28, 1931   2 Sheets-Sheet 1
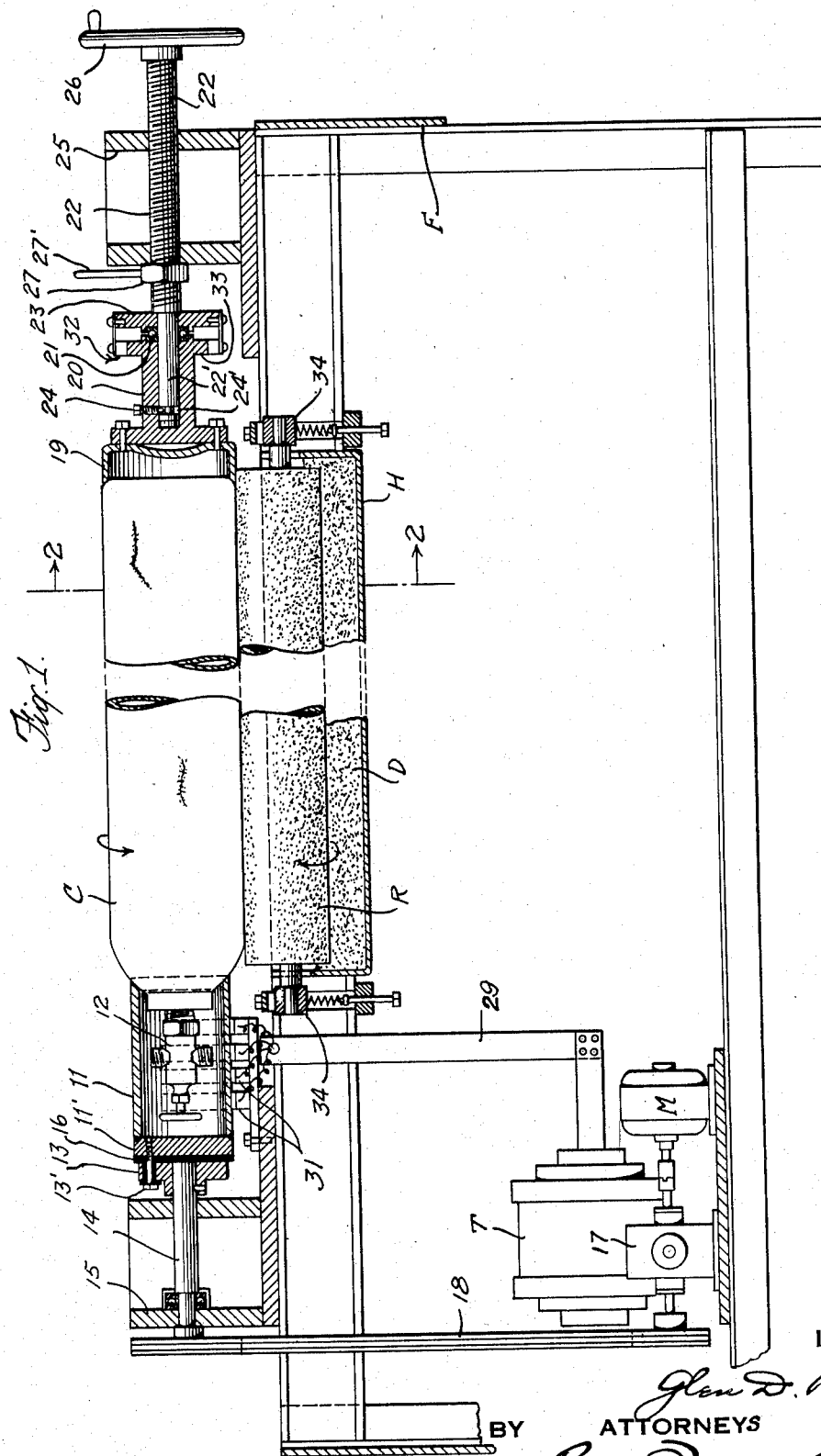
INVENTOR:
Glen D. Bagley,
BY   ATTORNEYS

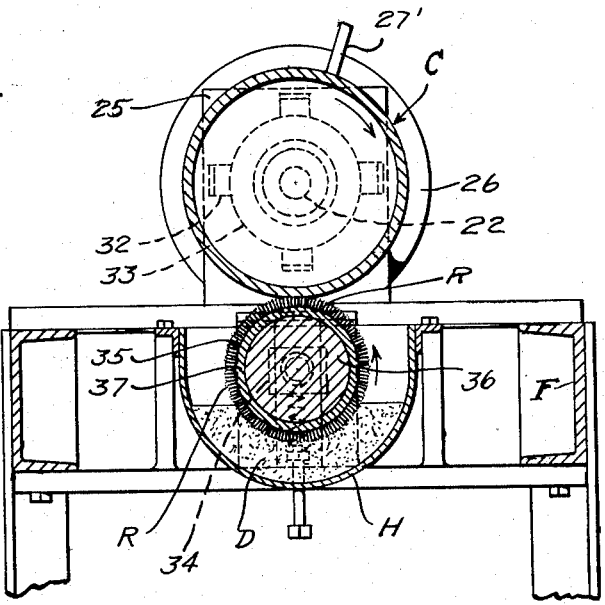
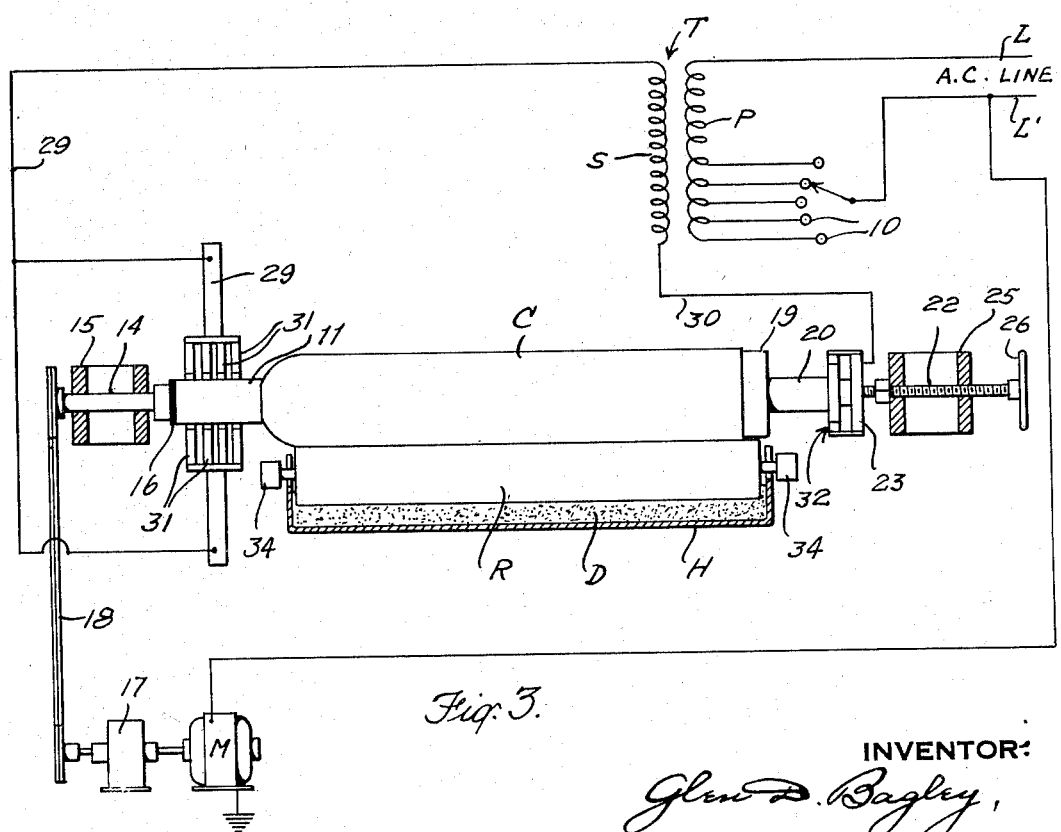

Patented Nov. 24, 1936

2,061,692

UNITED STATES PATENT OFFICE

2,061,692

TESTING APPARATUS

Glen D. Bagley, Great Neck, N. Y., assignor, by mesne assignments, to Union Carbide and Carbon Corporation, a corporation of New York Application September 28, 1931, Serial No. 565,683

11 Claims. (Cl. 175—183)

This invention relates to an improved apparatus for testing paramagnetic bodies, and particularly to apparatus especially adapted for detecting cracks and other flaws in steel or ferromagnetic tanks and cylinders used for storing and transporting compressed gases.

Heretofore, flaws, cracks and similar defects in iron, steel and other articles of paramagnetic material have been detected magnetically by either temporarily or permanently magnetizing the article under test with direct current and bringing iron filings or other finely-divided paramagnetic material in contiguity with the magnetized article. The apparatus necessary for this purpose includes a motor-generator set which is comparatively heavy and expensive, and requires considerable attention and maintenance.

Objects of this invention are to reduce the cost and weight of the electrical equipment used in testing apparatus of this kind; and to provide an improved apparatus whereby more dependable results can be obtained more economically when testing paramagnetic articles, especially tanks and cylinders used for storing and transporting compressed gases. These and other objects of the novel features of the invention will be apparent from the following description, taken with the accompanying drawings; in which Fig. 1 is a longitudinal sectional view of a testing apparatus embodying the principles of this invention;

Fig. 2 is a transverse sectional view of the apparatus taken on the line 2—2 of Fig. 1; and Fig. 3 is a diagrammatic view of the apparatus and its electrical circuits.

Generally speaking, according to this invention a magnetic flux is induced in the article of paramagnetic material undergoing test, as by connecting the article in circuit with a source of electric current, preferably an alternating current in which case an alternating magnetic field is induced within the article. Any crack or similar flaw in the surface of the magnetized article produces a corresponding discontinuity and an increased reluctance in the magnetic circuit and the flux is forced into the air across and adjacent to the crack. Such cracks and flaws may then be readily detected by applying a suitable mobile finely-divided paramagnetic material, such as a mixture of powdered iron and powdered zinc oxide, to the magnetized article. This powder will adhere to the surface of the article wherever the magnetic flux leaves the surface and will therefore outline or indicate the position of all cracks or flaws, even though microscopic in size.

In order to uniformly apply the finely-divided material to all surface portions of the magnetized article, the latter is desirably moved relatively to a device which distributes the finely-divided material and presents it in close proximity to the surface to be tested. When testing cylinders, such relative movement may comprise a relative rotation of the cylinder and the device which applies the magnetic powder.

The apparatus shown in the drawings, for the purpose of disclosing the principles of this invention, is especially designed for testing tubular or cylindrical articles such as steel tanks and cylinders. However, it will be understood that certain features of the invention are useful in testing other forms of articles. The article to be tested, such as a steel cylinder C, may be suitably supported at its ends so that it may be rotated about its longitudinal axis while it is magnetized and while the paramagnetic powder is applied thereto. The cylinder C may be magnetized by connecting it in circuit with a source of electric current and is preferably connected in series circuit with the secondary winding S of a static transformer T, the primary winding P of which is connected to alternating current supply mains L, L'. An alternating current, of suitable amperage and voltage to produce the proper magnetization, may be supplied by the secondary winding and fed through the cylinder,—the primary winding being provided with suitable means, such as the taps 10, to regulate the value of the current. To test a standard steel oxygen cylinder of 220 cubic feet capacity, it has been found that an alternating current of about 800 to 1200 amperes and about 3 to 5 volts gives satisfactory results.

Suitable means may be provided to support the article and to connect it in circuit with a suitable magnetizing current. As shown, a combined contactor and supporting sleeve 11 may receive and support the neck end 12 of the cylinder C, and may have a cover 11', so that the sleeve may be mounted by insulated stud bolts 13', on a flange 13 secured to a shaft 14 rotatably mounted in a bearing housing 15. The sleeve 11 may be insulated from the flange and shaft by a suitable insulating disc 16; and the shaft 14 and the sleeve 11 may be rotated by a small electric motor M through a suitable speed reducer 17 and a chain and sprocket drive 18 so as to rotate the work at a relatively slow speed,—about 2½ R. P. M. for a standard 220 cu. ft. oxygen cylinder having a diameter of 9$\frac{1}{16}$ inches and a length of 51 inches. The base end of the cylinder may be carried by a combined contactor and support 19 which has a shaft 20 fitting the reduced end 22' of an adjusting screw shaft 22 axially in line with the shaft 14. The shaft 20 may be journalled on a thrust bearing 21 carried by a disc 23 secured to the shaft 22, and a screw 24 thereon cooperating with a groove 24' in the end 22' normally prevents the separation of these shafts. The screw 22 may be mounted on a suitable support 25, and may be rotated and adjusted axially by means of a hand wheel 26 or the like, whereby the contactor-support 19 may be adjusted toward and away from the base end of the cylinder, to clamp the latter in testing position or to release it. Suitable locking means, such as a nut 27 on the screw 22, may be adjustable against the housing or support 25 by means of a pin 27' to retain the member 19 in clamping position and in good electrical contact with the cylinder. When so clamped, the neck end of the cylinder projects into the sleeve 11 and its shoulder bears against and makes good electrical contact with one end of the sleeve, and the cylinder is mounted so that it may be rotated about its longitudinal axis by the motor M.

Electric current for testing the cylinder may be supplied thereto through conductors or busbars 29 and 30. The conductor 29 may be connected to a set of brushes 31 which bear against the outer surface of the conductive sleeve 11, and the conductor 30 may be connected to the frame F or directly to a set of brushes 32 which are yieldingly mounted on the metal disc 23 and bear against a brass collar or ring 33 secured to the shaft 20. The secondary winding of the transformer T is thus electrically connected in series circuit with the cylinder to be tested.

Suitable means may be provided to apply and uniformly distribute mobile finely-divided paramagnetic material, such as a mixture of powdered iron and powdered zinc oxide, to the exterior surface of the magnetized cylinder as it rotates. As shown, this powder, indicated at D, may be contained in a trough H and brought into contact with the outer surface of the cylinder by a roller R, preferably of non-magnetic material. The trough H is desirably located below and extends lengthwise of the cylinder and is preferably made of suitable non-magnetic material, such as brass. The roller may be rotatably mounted in the trough and parallel to and below the cylinder by suitable spring-supported bearings 34 located at the ends of the trough and adjustable to hold the exterior surface of the roller in sufficient yielding frictional or pressing engagement with the cylinder, so that the roller may be rotated by such frictional contact at substantially the same surface velocity as the cylinder to apply the powder uniformly to successive longitudinal portions of the rotating cylinder. The quantity of powder kept in the trough desirably should be such that a substantial part of the lower side of the roller drags through the body of powder.

The exterior cylindrical surface of the roller R preferably consists of a carpet or fabric covering 35 having a nap, whereby the roller may readily pick up powder from within the trough, loosely hold and carry it to the surface of the magnetized cylinder, and then release it. The cylindrical body or core 36 of the roller desirably consists of non-magnetic material, such as wood or the like; and a layer 37 of resilient material, such as sponge rubber or the like, is desirably disposed between and secured to the core 36 and the covering 35, in order that the latter may readily adjust itself to depressions and other irregularities on the exterior surface of the cylinder. The carpet covering is thus sufficiently flexible to closely follow the outside contour of the cylinder and uniformly distribute the powder over the cylindrical surface. Making the roller and the powder trough of non-magnetic material improves the sensitiveness of the test. For convenience, the several parts of the apparatus may be mounted upon a suitable metal frame or bench F.

The operation of the improved apparatus will be apparent from the foregoing description. The cylinder or other article to be tested, having been clamped between the supporting contactors, is rotated when the line switch of motor M is closed, and the circuit which supplies the magnetizing current may be closed at the same time. The roller R, which frictionally engages the magnetized cylinder, then also rotates and its lower side passes through the magnetic powder and carries a film thereof into contact with the cylindrical surface. Since the surface velocities of the cylinder and roller are the same, there will be substantially no wiping action between them which might obliterate the indication. Also, by locating the roller and trough below the cylinder any excess powder may readily drop from the cylinder back into the trough before giving the observer a false indication. With the cylinder rotating at about two revolutions per minute and with an applied alternating magnetizing current of about 1000 amperes at about 3 to 5 volts, the entire surface of a 220 cu. ft. cylinder can be tested and inspected in from two to three minutes after the cylinder has been clamped in place.

While either direct current or alternating current may be employed with my improved apparatus to temporarily or permanently magnetize the cylinder or other work to be tested, I find that the use of an alternating magnetizing current is decidedly advantageous and, when testing articles such as cylinders, I preferably employ an alternating current of comparatively high-amperage and low-voltage, as previously indicated,—the value of the current being suitably adjusted for other articles according to their size. The electrical apparatus required for supplying the alternating current used is about one-tenth as expensive as that required for furnishing direct current; and the transformer and its accessories are very much lighter than the motor-generator set needed when using direct current for such testing, thus providing a testing apparatus which is comparatively inexpensive and readily movable from place to place. The intermittent magnetization induced in the work by the alternating current produces more reliable results than those obtained with direct current since, in a given period, more of the paramagnetic particles migrate toward and adhere to the crack or defect and thus produce a more pronounced indication that is more readily visible to the operator. It appears that the induced magnetic field of rapidly changing polarity is more effective, than a field induced by direct current, in agitating the particles and changing their position because the particles acted upon by the alternating flux move from point to point and come to rest intermittently, whereby their position is changed relative to successive magnetic impulses.

It will be obvious that various changes may be made in the apparatus disclosed herein without departing from the principles of this invention. For example, the form of the supporting contactors may be varied to suit the contour of the particular articles to be tested; and the magnetic powder may be sifted onto the magnetized test piece or otherwise applied thereto.

I claim:

1. Apparatus for testing a paramagnetic article comprising the combination of: means for rotating an article; means adapted to magnetize said article while it is rotating; and non-magnetic means operably connected to and controlled by the article and adapted to apply paramagnetic material to such magnetized rotating article.

2. Apparatus for testing a paramagnetic article comprising the combination of means for supporting an article undergoing test, means adapted to magnetize said article, and rotatable means adapted to yieldingly engage said article and to apply finely-divided paramagnetic material to the surface of such article.

3. Apparatus for testing a paramagnetic article comprising the combination of means for supporting an article undergoing test, means whereby said article is magnetized, and roller means adapted to carry finely-divided paramagnetic material, said roller means being rotatable relatively to and adapted to contact the article carried by such supporting means.

4. Apparatus for testing a cylindrical article of ferromagnetic material comprising the combination of: means for rotating such article about its longitudinal axis; means whereby the article may be magnetized while it rotates; and means whereby finely-divided ferromagnetic material may be applied to the surface of such magnetized rotating article, the last-mentioned means comprising a container for the finely-divided material and a roller adapted to engage the body of finely-divided material and yieldingly to engage the surface of the cylindrical article.

5. In testing apparatus, a device for applying finely-divided paramagnetic material to a magnetized article undergoing test, said device having on a surface thereof means adapted to loosely hold the finely-divided material and to readily release and distribute the same over the entire surface of such magnetized article when such article and the surface of said device are brought into contiguous relation.

6. The invention as defined in claim 5, in which said means comprises a fabric covering having a nap.

7. In testing apparatus, a device for applying finely-divided paramagnetic material to a magnetized article undergoing test, said device comprising a non-magnetic body, a fabric covering having a nap, and resilient means between said body and said covering.

8. A roller for use in testing apparatus, comprising a cylindrical body of non-magnetic material, an outer covering therefor of carpet or the like having a nap, and a layer of resilient material between said body and said covering.

9. Apparatus as claimed in claim 3 in which the means whereby said article is magnetized includes a transformer having its secondary winding connected in circuit with the article undergoing test.

10. Apparatus for testing cylinders for compressed gases comprising a frame, a pair of cylinder supporting means, one of said means comprising a rotatable contactor support for engaging the bottom of said cylinders, the other of said means comprising a rotatable sleeve to receive and engage the top end of the cylinder, one of said means being insulated from said frame and having a surface engageable by a current collecting brush, a current collecting brush engaging said surface, a transformer having its secondary winding connected to said cylinder supporting means, said connection including said brush and said surface, and means for applying particles of paramagnetic material to said cylinder.

11. Apparatus for testing a cylindrical article comprising a frame, two rotatable supports mounted thereon for supporting the article being tested, at least one of said supports being insulated from said frame, a transformer, connections from the secondary winding of said transformer to said supports, said connections including a collecting ring on said insulated support and a brush engaging said ring, means for rotating said article supports, and means comprising a roller member adapted to engage and be driven by said cylindrical article being tested, for applying free particles of finely divided paramagnetic material to said cylindrical article.

GLEN D. BAGLEY.